United States Patent [19]

Yabuuchi et al.

[11] Patent Number: 4,774,395
[45] Date of Patent: Sep. 27, 1988

[54] ELECTRIC HEAT STORAGE APPARATUS EMPLOYING PENTAERYTHRITOL HEAT STORAGE COMPOSITIONS

[75] Inventors: Hidetaka Yabuuchi, Takarazuka; Yoshiyasu Endo, Hirakata; Akira Kataoka, Minoo; Tsuneo Shibata, Kawanishi, all of Japan

[73] Assignee: Matsushita Electric Industrial Co., Ltd., Kadoma, Japan

[21] Appl. No.: 809,778

[22] Filed: Dec. 17, 1985

[30] Foreign Application Priority Data

| Dec. 18, 1984 | [JP] | Japan | 59-266658 |
| Dec. 18, 1984 | [JP] | Japan | 59-266659 |
| Jan. 28, 1985 | [JP] | Japan | 60-13713 |
| Mar. 19, 1985 | [JP] | Japan | 60-54923 |
| Mar. 19, 1985 | [JP] | Japan | 60-54924 |

[51] Int. Cl.[4] .............. H05B 3/00; D06F 75/24; C09K 5/00; F24H 7/00
[52] U.S. Cl. .................. 219/275; 38/77.83; 38/82; 38/93; 165/10; 165/902; 219/254; 219/258; 219/302; 219/365; 219/378; 219/530; 219/540; 252/73; 524/322
[58] Field of Search ............... 219/245-259, 219/378, 365, 530, 540, 302; 165/10 A; 524/322; 38/75-82, 93; 252/73

[56] References Cited

U.S. PATENT DOCUMENTS

| 3,884,295 | 5/1975 | Laing et al. | 165/10 A |
| 3,960,207 | 6/1976 | Boer | 165/10 A |
| 4,003,426 | 1/1977 | Best et al. | 165/10 A |
| 4,248,291 | 2/1981 | Jarmul | 219/378 X |
| 4,487,856 | 12/1984 | Anderson et al. | 524/322 X |
| 4,572,864 | 2/1986 | Benson | 252/73 X |

FOREIGN PATENT DOCUMENTS

| 784149 | 4/1935 | France | 38/88 |
| 1576769 | 8/1969 | France | 219/378 |
| 1291493 | 3/1969 | Fed. Rep. of Germany | 219/378 |
| 3018799 | 11/1981 | Fed. Rep. of Germany | 165/10 A |
| 59-168900 | 9/1984 | Japan | 219/258 |
| 59-171598 | 9/1984 | Japan | 219/258 |
| 60-48800 | 3/1985 | Japan | 219/258 |
| 60-137398 | 7/1985 | Japan | 219/258 |
| 60-137399 | 7/1985 | Japan | 219/258 |
| 60-156500 | 8/1985 | Japan | 219/258 |
| 60-165999 | 8/1985 | Japan | 219/258 |
| 60-166000 | 8/1985 | Japan | 219/258 |
| 60-212200 | 10/1985 | Japan | 219/258 |

*Primary Examiner*—Anthony Bartis
*Attorney, Agent, or Firm*—Cushman, Darby & Cushman

[57] ABSTRACT

An electric heat storage apparatus, such as a steam iron, hot plate, pan, etc., includes a metal body defining a hollow housing enclosing a heat storage device containing a thermally decomposable heat storage substance comprising 30-99% by weight pentaerythritol. The heat storage substance is completely confined in a fluororesin enclosure which isolates the substance from the metal body and prevents contact of ambient air therewith so that the thermal stability of the pentaerythritol is enchanced. The metal body is heated by an electric heating element to a selected temperature for storing heat in the heat storage substance. In the case of use as a cordless electric steam iron, the metal body forms the sole plate of the iron and is provided with a vaporization chamber in heat exchange relationship with the heat storage substance for the generation of steam.

12 Claims, 9 Drawing Sheets

4 — Pentaerythritol Heat Storage Material

4,774,395

ELECTRIC HEAT STORAGE APPARATUS EMPLOYING PENTAERYTHRITOL HEAT STORAGE COMPOSITIONS

FIELD OF THE INVENTION AND RELATED ART STATEMENT

1. Field of the Invention

The present invention generally relates to a heating apparatus and particularly pertains to a heating apparatus which has a heat storage device and is usable without an electric cord.

2. Description of the Related Art

Heretofore, attempts have been made to attain improvement in the heating characteristics of such heating apparatuses as hot plates, electric irons, etc., by preventing quick cooling of the heating surface in their practical use by way of addition of a heat storage function to them or to achieve enhancement in their operational facility through a so-called cordless operation. That is, by making the apparatus to be operable for a certain time period, while being isolated from a power source.

In the conventional art for addition of the heat storage function to the heating apparatus of this type, their heat mass due to their specific heat is increased by increasing the weight of their heating base and they are usually provided with heat storage substances which have latent heat at specified temperatures.

The heat storage substances used in these heating apparatuses need to be capable of storing and discharging heat within a temperature range of 150°–250° C. and specially to be highly assured of safety, for its usage environment which is often in a household. The present inventors, as a result of examination of many types of materials, focused their attention to pentaerythritol as the heat storage material for this purpose. Pentaerythritol has its crystal transition point at 188° C., its latent heat of transition is as large as about 300 j/g, and pentaerythritol itself is widely used in large amounts as raw materials for resins and paints, and is readily available.

But although belonging to a type which is relatively stable under heating, among other organic substances, pentaerythritol is known to gradually lose heat storage capacity due to degradation from oxidation, when exposed to high temperatures in air for a long time, and it has been made evident that particularly in such high temperatures as above 200° C. even in a closed system isolated from ambient air the presence in the system of substances incompatible with pentaerythritol likewise results in loss of the heat storage capacity.

Thus an examination for compatibility of pentaerythritol with various materials has revealed that a notable reduction in its heat storage capacity is apparent, especially when pentaerythritol is heated for a long time while in contact with metal.

Generally, the housing for containing the heat storage substance is normally composed of metal to ensure high heat resistance, high thermal conductivity and mass production capacity, etc. The aforementioned result points to the inadequacy of metal for the housing for containing pentaerythritol in view of the adverse effect on its durability, thus raising a problem in practical application of pentaerythritol as a heat storage substance.

Another problem was that if pentaerythritol was completely enclosed in a housing for prevention of its deterioration from oxygen, as above described, its degradation occurred after long-period use, even though the housing was composed of a nonmetal substance which was highly compatible with this material. The decomposed gas gradually accumulated inside the housing, posing the hazard that internal pressure in the housing would go on rising.

OBJECT AND SUMMARY OF THE INVENTION

The present invention was intended to solve such problems and has as its object realizing of a highly safe heating apparatus in which no acceleration of pentaerythritol deterioration will take place, even when being contained in a metal housing, ensuring its durability maintenance, and moreover, which involves no fear of causing an internal pressure rise even in a long period of use.

The heating apparatus of this invention has a heat storage device confined in a metal housing and containing a heat storage substance having pentaerythritol as its main component. The heat storage substance is isolated from the metal body and from ambient air by matter containing fluororesin.

When such a construction is adopted, the fluororesin which is inert to pentaerythritol not only forecloses contact of the latter with the housing material surface thereby preventing reduction in the heat storage capacity of pentaerythritol, but also even in long-period use there is no fear of abnormal rising of internal pressure because the decomposed gas gradually discharges thanks to the proper permeability of the fluororesin. Wherefore a heating apparatus having a heat storage function and guaranteed for safety and long life may be realized.

Furthermore, a satisfactory heat storage effect is obtained by utilizing as the heat storage substance of the heating apparatus a substance comprising 30–99% by weight of pentaerythritol and 1–70% by weight of a mixture of less than 70% by weight of at least one polymer selected from the group consisting of olefinic polymers and fluorine-base polymers and less than 70% by weight of petroleum wax having a carbon number of at least 16.

Furthermore, preferable ones for use as the aforementioned olefinic polymers are ethylene polymer, propylene polymer, methylpentene polymer; and as the fluorine-base polymers, tetrafluoroethylene polymer, tetrafluoroethylene-perfluoroalkyl vinyl ether copolymer, tetrafluoroethylene-hexafluoropropylene copolymer, tetrafluoroethylene-ethylene copolymer and vinylidene fluoride polymer.

Further, preferable ones for use as petroleum wax are paraffin wax, microcrystalline wax or petrolactum, each having a carbon number of at least 16.

Furthermore, to isolate the heat storage substance from the metal housing it is preferable to enclose the substance in a separate container made of fluororesin.

Moreover, it is preferable to have silicone interposed between the aforementioned container and the housing.

Furthermore, it is preferable to form a vaporizing chamber in the housing cover.

Then further, as the heat storage elements, flat plate-shaped heat storage elements having the heat storage substance enclosed in containers formed of fluororesin film, which are held between and in contact with the internal bottom surface of the housing and the inside face of a housing cover, are preferable.

Furthermore, as the aforementioned heat storage elements, a plurality of sheets of heat storage elements, which are laminated and provided with heat transferring plates linked thermally to the base or the housing cover, are preferable.

Moreover, preferable as the aforementioned heat storage element is one with the heat storage substance enclosed in a container formed in an undulating shape of fluororesin film, which is securely held between and in contact with complementary undulating inside faces of the housing and the housing cover.

Furthermore, preferable is a construction wherein a fluororesin coating is formed on the inside surface of the housing and on the peripheral rim of the open mouth thereof, and the mouth is sealed by mounting a housing cover on the rim.

And still further, preferable is a construction having a fluororesin coating formed at least on the part of the aforementioned housing cover which abuts on the opening or mouth peripheral rim.

DESCRIPTION OF THE PREFERRED EMBODIMENTS

Figure 1:
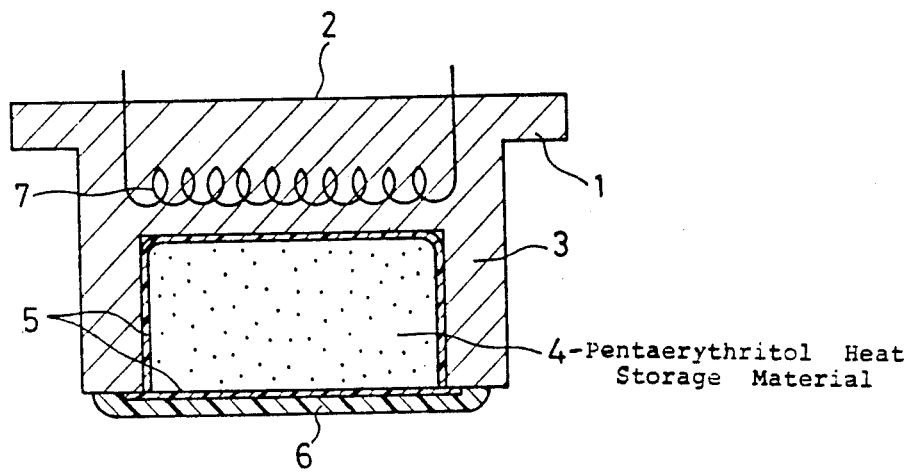
FIG. 1 is a sectional view of a heating apparatus having a heat storage device embodying the present invention.

In the following, embodiments in accordance with the present invention are described with reference to the accompanying drawings:

FIG. 1 shows a heating apparatus having a heat storage device embodying this invention. In this apparatus, a metal base 1 has a heating face 2 at its top part and a housing 3 at the lower part. A heat storage substance of pentaerythritol as its main ingredient is contained in a container 5 made of a fluororesin which is located in the housing 3. A sheet 6 of silicone rubber secures the container 5 in the housing 3. The silicone rubber sheet is formed by applying liquid silicone rubber over the container and on the rim of the housing 3 in such a way as to coat it and subsequently set. A heating element 7 for heating the substance 4 is installed in a part of the base 1 above the housing 3. Since the substance 4 is hermetically sealed in the container 5, the substance 4 is not exposed to air. Since the container 5 is formed of the fluororesin which is inert to the substance 4 so as to isolate substance 4 from the housing 3, it prevents the substance 4 from direct contact with the housing. Therefore, the heat storage capacity of the substance 4 will not be degraded by contact with metal, even if the substance 4 continues to be heated for long time at temperatures higher than its heat storage temperature.

Figure 2:
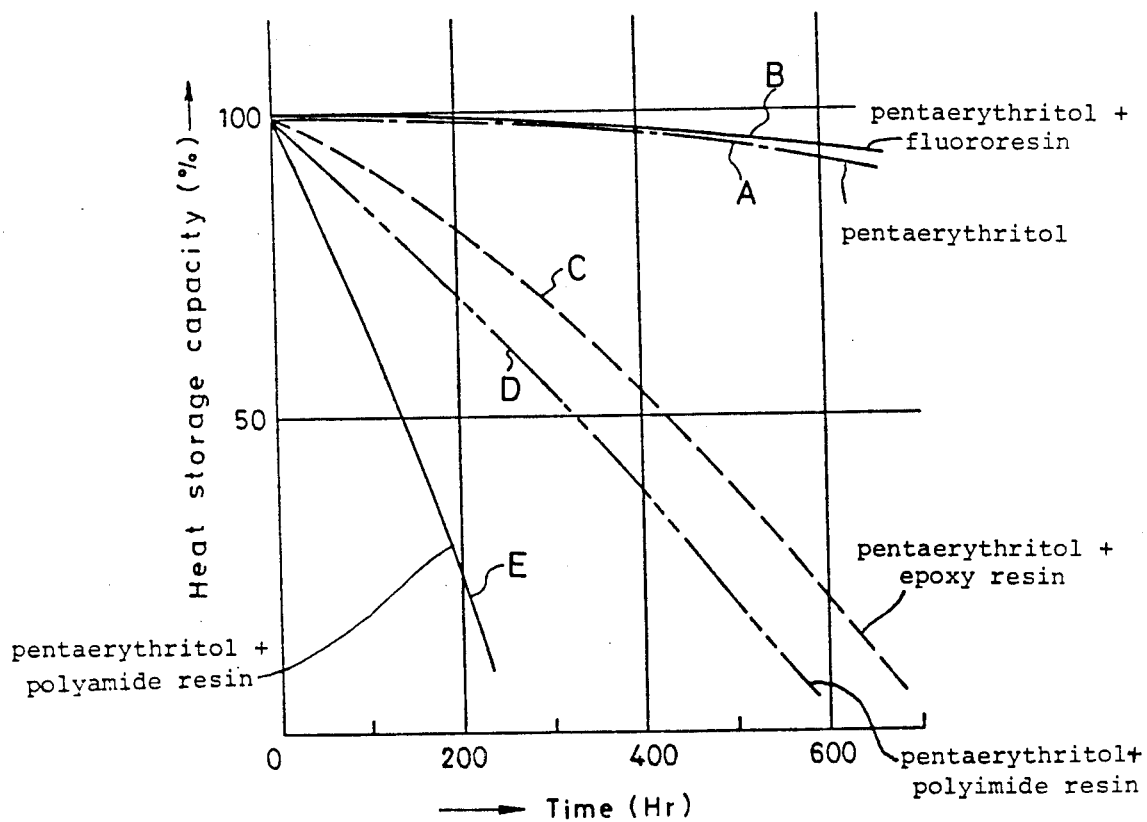
FIG. 2 is a characteristic graph showing compatibilities of pentaerythritol with various types of heat-resistant resin.

FIG. 2 illustrates experimental results indicating that fluororesin, among various types of heat-resistant resins, is inert to pentaerythritol. The method of the experiment comprises sealing pentaerythritol and a test piece of each heat resistant resin in respective glass tubes, then subjecting them to a continuous heating test in an atmosphere of 220° C., and measuring the changes of the heat storage capacity of each sample. In this graph, curve A illustrates a case wherein in the tube pentaerythritol only is enclosed; curve B is for a case wherein in the tube pentaerythritol is mixed with fluororesin (PTFE); curve C is for a case wherein the pentaerythritol is mixed with epoxy resin; curve D is for a case wherein the pentaerythritol is mixed with polyimide resin; and curve E is for a case wherein the pentaerythritol is mixed with polyamide resin (nylon 66). All resins other than the fluororesin of curve B, being poorly compatible with pentaerythritol, caused a reduction in its heat storage capacity. Especially, of the fluororesin, three types—PTFE (tetrafluoroethylene resin), PFA (tetrafluoroethylene-perfluoroalkyl vinyl ether copolymer resin) and FEP (tetrafluoroethylene hexafluoropropylene copolymer resin) which have high thermal resistance temperatures—have been found suitable as materials of the container 5.

Furthermore, as compared with other resins, fluororesins show high gas permeabilities, and even when the container 5 is completely sealed by way of welding, the gas generated in the container 5 is gradually discharged. Accordingly, even if deterioration of the heat storage substance 4 has advanced after a long-period use, the internal pressure of the container 5 will not abnormally go up.

Figure 3:
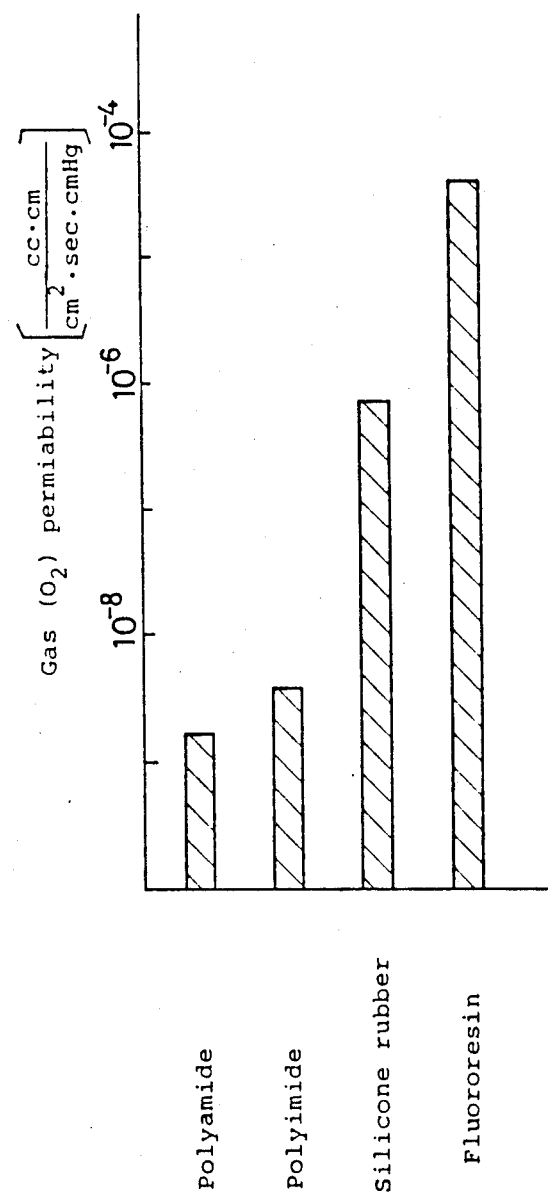
FIG. 3 is a characteristic chart showing gas permeabilities of the resins.

FIG. 3 shows the gas permeabilities of the resins. The graph reveals that the fluororesin has high gas permeability, thus testifying to its high gas transmitting property. Rubber generally has high permeability and silicone rubber is no exception, its gas permeability being very high.

Accordingly, even if the heat storage container 5 is covered with a sheet of silicone rubber and secured in the housing as in this embodiment, not only may the gas permeability between the heat storage container 5 and the ambient air be maintained, but also various degrees of gas permeability may be obtainable by altering the thickness of the silicone rubber 6 in correspondence with the size of the housing 3 opening.

Next, the heat storage substance 4 is explained: this substance 4 is prepared by mixing less than 70% by weight of at least one polymer of the group consisting of olefinic polymer and fluorine-resin polymer and less than 70% by weight of petroleum waxes having a carbon number of at least 16 (provided that their sum total amount falls within a range of more than 1 but less than 70% by weight) with 30-99% by weight of pentaerythritol; it is manufactured by heating, when mixing them, at temperatures higher than the melting points of the petroleum waxes.

Generally, industrial pentaerythritol contains mixed therein dipentaerythritol and bispentaerythritol monoformal condensate, being a reaction by-product in synthesis, and such organic acid neutralization salts as sodium hydroxide, potassium hydroxide, etc., which are used as synthetic catalysts, For this reason, the melting point of pentaerythritol is greatly lower than 260° C. which is its intrinsic value (for example, the melting point is about 200° C. when the pentaerythritol content is around 95% by weight). Therefore, hitherto pentaerythritol is not only molten by heating around its phase transition temperature, but also when it is intended to be used as a heat storage substance by being held at temperatures above its phase transition temperature for long time; and its denaturing from decomposition, etc., proceeds within a short period and, hence, its heat storage property is lost. By coating the surface part of pentaerythritol crystal particles with the olefinic polymer or fluorine-resin polymer or petroleum wax, when it is heated to above its phase transition temperature, the substances is given the capacity of selectively eliminating from the surfaces of its crystal grains such factors as to induce or accelerate decomposition of deposited reaction by-products which are inevitably produced during its manufacture, e.g. oxygen and dust in air, rust generated on the container wall with which they come in contact, components moving and bleeding out from the container material, and further, the substance is given the capacities of being isolated from such factors thereby allowing the coating material to be maintained in a stable state for long time without having any adverse effects on pentaerythritol. Besides, since its shape holding property is improved through mixing the pentaerythritol with such materials as above described, it permits easy forming with press, etc., and moreover, the mixing gives high conformity to containers of various shapes in filling therein.

[Example-A]

Of olefinic polymers, Novatek L (Trade name of a low-density polyethylene resin, manufactured by Mitsubishi Chemical Industries, Ltd.) was used as a low-density ethylene polymer, which was pulverized to have 1–10μ particle diameters and Pentalit M (Trade name manufactured by Koei Chemical Co., Ltd., total amount of dipentaerythritol and bispentaerythritol condensate is 0.6% by weight), are mixed at material components ratios of heat storage given under Experiment Nos. 1–7 in Table 1 for the total mixed amount of 100 weight parts. The individual samples were put in separate glass beakers and vigorously stirred while heating at 150° C. from outside, and resultant crystal grain surface part of pentaerythritol was subjected to a coating treatment with ethylene polymer. After cooling each sample, 10 g of it was taken and pressed at a pressure of 700 kg/cm$^2$ to form a 4.1 mm I.D. vessel; single liquid thermosetting silicone rubber was applied to the gap or clearance part between the vessel and the glass cover, and was then heated at 150° C. for 30 minutes, to be set, thus effecting hermetic sealing. In that way, samples for long heating stability tests were manufactured. In addition, pentaerythritol only was treated in a similar way as above described, thereby forming Comparison sample-1. The samples of long heating stability test formed in this way are introduced for use in obtaining distinctive evidence of the stability difference under heating from the comparison sample having only pentaerythritol sealed therein. Since the glass vessel is used as it is without being cleaned, minute amounts of some foreign matters like dust are deposited on it and because its material is soda glass, minute amounts of freed sodium ions, etc., are present. Besides, because of the use of dies when pressing pentaerythritol at a pressure of 700 kg/cm$^2$, deposition of rust, etc., on the surface of the pressed heat storage substance inevitably takes place. When this sample is put in the aforementioned vessel, which is, then, covered with a glass plate to internally touch thereon and the clearance part therebetween is sealed by applying a single liquid thermosetting silicone rubber (TSE-326, manufactured by Toshiba Silicone K.K. used), silicone rubber filled with iron oxide, etc., deposits partly on the heat storage substance and because of the property of this rubber permitting selective permeation of oxygen in air, contact between minute amounts of oxygen and heat storage substance occurs. Thus, the test samples added with such factors for inducing or accelerating decomposition are formed. In addition, in order to elucidate the effect of each decomposition factor for the sample sealed in the glass vessel, a fused glass tube of 16 mm in dia. and 50 mm long made of the same material as the vessel wherein pentaerythritol only was contained was prepared and designated as Comparison sample-2.

The samples manufactured in this way were put in a thermostat held at 230° C.±2° C., taken out after a lapse of 500 hours and, then, after observing the discoloration state of heat storage substances, phase transition heat (J/g) and the phase transition temperature of the radiation side were measured by a differential scanning calorimeter (Type DT-30B, manufactured by Shimazu Seisakusho). The results are shown in Tables (1) and (2), in comparison with the characteristics (initial characteristics) of the samples which are prior to carrying out of the long heating stability test.

TABLE 1

| | Heat storage material composition (weight %) | | | | Initial characteristics | | | |
|---|---|---|---|---|---|---|---|---|
| No. | Olefinic polymer(*1) | Fluorine resin polymer | Petroleum wax | Pentaerythritol(*4) | Heat of phase transition (J/g) | Ratio of phase transition heat to that of pure pentaerythritol (%) | Ratio of the amount for storaging equal heat to the amount of pure pentaerythritol (weight ratio) | Phase transition temperature (°C.) |
| 1 | 1 | — | — | 99 | 268 | 99.3 | 1.01 | 177.1 |
| 2 | 5 | — | — | 95 | 268 | 99.3 | 1.01 | 177.2 |
| 3 | 10 | — | — | 90 | 250 | 92.6 | 1.08 | 177.2 |
| 4 | 30 | — | — | 70 | 225 | 83.3 | 1.2 | 177.1 |
| 5 | 50 | — | — | 50 | 170 | 63.0 | 1.59 | 177.0 |
| 6 | 70 | — | — | 30 | 100 | 37.0 | 2.7 | 177.0 |
| 7 | 80 | — | — | 20 | 65 | 24.1 | 4.15 | 177.2 |

TABLE 1-continued

| | | | | | | | | |
|---|---|---|---|---|---|---|---|---|
| ** | — | — | — | 100 | 270 | — | 1.0 | 177.5 |
| *** | — | — | — | 100 | 270 | — | 1.0 | 177.5 |

| | | | Characteristics after 230° C. × 500 hr | | | |
|---|---|---|---|---|---|---|
| No. | Heat of phase transition (J/g) | Ratio of phase transition heat to that of pure pentaerythritol (%) | Phase transition temperature (°C.) | Fall in phase transition temperature (°C.) | Degree of discoloration of heat storage material | Judgment |
| 1 | 204 | 76.1 | 175 | 2.1 | Weak yellow | O |
| 2 | 215.7 | 80.5 | 176 | 1.2 | Weak yellow | ⓞ |
| 3 | 248 | 99.2 | 176.3 | 0.9 | Weak yellow | ⓞ |
| 4 | 220 | 97.8 | 176.5 | 0.6 | Weak yellow | ⓞ |
| 5 | 166 | 97.7 | 176 | 1.0 | Weak yellow | ⓞ |
| 6 | 99.4 | 99.4 | 176 | 1.0 | Weak yellow | ⓞ |
| 7 | 20 | 30.8 | 151 | 26.1 | Yellowish brown | X |
| ** | 20 | 7.4 | 120 | 57.5 | Browny resinous | X |
| *** | 130 | 48.1 | 155 | 22.5 | Brown | X |

Criterion: ⓞ Excellent O Good Δ Fair X Poor
**Comparison sample No. 1 (Pentalit M)
***Comparison sample No. 2
(*1)Ethylene polymer: Novatek L (Trade name, manufactured by Mitsubishi Chemical Industries, Ltd.)
(*4)Pentalit M (Trade name, Koei Chemical Co., Ltd.)

In the results of Table 1, the characteristics of the Comparison sample-1 of only pentaerythritol, which is measured after the stability test of 230° C.×500 hr long heating, showed notably reduced results, as compared with its initial characteristics, and the heat storage substance turned into a browny resinified state. Comparison sample-2 has better thermal stability than Comparison sample-1, but is not in a practically usable state. As compared with these results, Samples Nos. 1-6, though showing decreases in heat of phase transition corresponding to the amounts of Novatek L added, give adequate results even after the 230° C.×500 hr long heating stability test, and their coloration degrees of the heat storage substance are very low. However, as the proportion of the ethylene monomer combined is increased to 80 weight parts, the deterioration becomes notable, thus detracting from practical use of such compositions. When these heat storage substance are put into practical uses, the larger becomes the amount of Novatek L which occupies the composition, the use amount ratio corresponding to the heat generated by pentaerythritol will grow larger as compared with the material consisting of pentaerythritol only. But this ratio is not so large as to make the material unusable. These results tell that the practically usable range of Novatek L in heat storage substance or its mixing ratio in the heat storage substance composition should be 1-70% by weight, and more preferable range is 5-50% by weight.

[Example-B]

As paraffin wax, HNP-9 (manufactured by Nippon Seiro Co., Ltd; melting point 65° C. and 25-35 carbon numbers) was used; this wax and pentaerythritol (the same product as that of Example-A) were mixed in the same ratios as the heat storage substance composition ratios of Experiments Nos. 8-14 shown in Table 2 for the total of 100% by weight parts. Thereafter long heating stability test samples were prepared by the similar treatments as in the foregoing Example-A. These samples were put in a 230° C.±2° C. thermostat container and taken out after a lapse of 500 hr and after observing the state of discoloration of the heat storage substance, the heat of phase transition (J/g of the heat discharging side) and phase transition temperature were measured; and the results are shown in Table 2-(1) and 2-(2), in comparison with its initial characteristics. The column of remnant rate (%) of the composition-dependent phase transition heat and that of the using amount ratio corresponding to the heat of pentaerythritol in the initial characteristics in Table 2 are filled, with the results with Comparison sample-1 in Table 1 as the references.

TABLE 2

| | Heat storage material composition (weight %) | | | | Initial characteristics | | | |
|---|---|---|---|---|---|---|---|---|
| No. | Olefinic polymer | Fluorine resin polymer | Petroleum wax(*3) | Pentaerythritol(*4) | Heat of phase trasition (J/g) | Ratio of phase transition heat to that of pure pentaerythritol (%)(*5) | Ratio of the amount for storaging equal heat to the amount of pure pentaerythritol (weight ratio)(*6) | Phase transition temperature (°C.) |
| 8 | — | — | 0.5 | 99.5 | 270 | 100 | 1.0 | 178 |
| 9 | — | — | 1 | 99 | 269 | 99.6 | 1.0 | 178 |
| 10 | — | — | 10 | 90 | 265 | 98.1 | 1.02 | 177.5 |
| 11 | — | — | 30 | 70 | 235 | 87.0 | 1.15 | 177.7 |
| 12 | — | — | 50 | 50 | 165 | 61.1 | 1.64 | 177.5 |
| 13 | — | — | 70 | 30 | 105 | 38.8 | 2.57 | 177 |
| 14 | — | — | 80 | 20 | 70 | 25.9 | 3.86 | 177.4 |

| | Characteristics after 230° C. × 500 hr | | | | | |
|---|---|---|---|---|---|---|
| No. | Heat of phase transition (J/g) | Ratio of phase transition heat to that of pure pentaerythritol (%) | Phase transition temperature (°C.) | Phase transition temperature fall rate (°C.) | Degree of discoloration of heat storage material | Judgment |

TABLE 2-continued

| | | | | | | |
|---|---|---|---|---|---|---|
| 8 | 115 | 42.6 | 165 | 13 | Brown | X |
| 9 | 200 | 75.6 | 175 | 3.0 | Weak yellow | ◯ |
| 10 | 260 | 98.1 | 177 | 0.5 | Weak yellow | ◉ |
| 11 | 233 | 99.1 | 177 | 0.7 | Weak yellow | ◉ |
| 12 | 163 | 99.1 | 177 | 0.5 | Weal yellow | ◉ |
| 13 | 102 | 97.3 | 176 | 1.0 | Weak yellow | ◉ |
| 14 | 30 | 42.9 | 150 | 27.4 | Yellowish brown | X |

Criterion: ◉ Excellent ◯ Good △ Fair X Poor
[*3]Paraffin wax: HNP-9 (Nippon Seiro Co., Ltd.)
[*4]Pentalit M (Koei Chemical Co., Ltd.)
[*5],[*6]The results with Comparison sample-1 in Table 1 are taken as references.

With regard to the results of Table 2, the characteristics after a 230° C.×500 hr long heating stability test gave results as indicated under Test Nos. 8 and 14, that the stability of the heat storage substance deteriorates, when the proportion of paraffin wax HNP-9 in the heat storage substance composition is less than 1% more than 70%. The results of Experiments Nos. 8–14 indicate that the practically usable heat storage substance should have paraffin wax HNP-9 in the proportions of 1–70% by weight HNP-9 in the heat storage substance composition, as against pentaerythritol.

by the similar method as in Example-B. Results of the measurements are shown in Tables 3-(1) and 3-(2).

With regard to the measurement results of Table 3, the characteristics after the 5000 hr long heating stability test at 230° C. show, as indicated by the results of Experiment No. 20, poor stability in the heat storage substance having the composition of the low molecular weight propylene polymer and Microcrystalline wax Hi-MiC-2095 is in excess of 70 by weight, as their sum total mixing ratio. But excellent results are obtained at the mixing ratios indicated under Experiments Nos. 15–19.

TABLE 3

| | Heat storage material composition (weight %) | | | | Initial characteristics | | | |
|---|---|---|---|---|---|---|---|---|
| No. | Olefinic polymer[*1] | Fluorine resin polymer | Petroleum wax[*3] | Pentaerythritol[*4] | Heat of phase transition (J/g) | Ratio of phase transition heat to that of pure pentaerythritol (%)[*5] | Ratio of the amount for storaging equal heat to the amount of pure pentaerythritol (weight ratio)[*6] | Phase transition temperature (°C.) |
| 15 | 2.5 | — | 2.5 | 95 | 267 | 98.9 | 1.01 | 176 |
| 16 | 5.0 | — | 5.0 | 90 | 248 | 91.9 | 1.09 | 177 |
| 17 | 15 | — | 15 | 70 | 220 | 81.5 | 1.23 | 177 |
| 18 | 25 | — | 25 | 50 | 166 | 62.2 | 1.63 | 177.2 |
| 19 | 36 | — | 35 | 30 | 95 | 35.2 | 2.84 | 177 |
| 20 | 40 | — | 40 | 20 | 70 | 25.9 | 3.86 | 177.2 |

| | Characteristics after 230° C. × 500 hr | | | | | |
|---|---|---|---|---|---|---|
| No. | Heat of phase transition (J/g) | Ratio of phase transition heat to that of pure pentaerythritol (%) | Phase transition temperature (°C.) | Fall in phase transition temperature (°C.) | Degree of discoloration of heat storage material | Judgment |
| 15 | 220 | 82.4 | 176 | 0 | Weak yellow | ◯ |
| 16 | 246 | 99.2 | 176.8 | 0.2 | Weak yellow | ◉ |
| 17 | 218 | 99.2 | 176.5 | 0.5 | Weak yellow | ◉ |
| 18 | 162 | 97.7 | 176.4 | 0.8 | Weak yellow | ◉ |
| 19 | 92.9 | 97.8 | 176 | 1.0 | Weak yellow | ◉ |
| 20 | 29.5 | 42.2 | 151.9 | 25.3 | Weak brown | X |

Criterion: ◉ Excellent ◯ Good △ Fair X Poor
[*1]Low molecular weight propylene polymer: Viscol 550p (manufactured by Sanyo Chemical Industries, Ltd.)
[*3]Microcrystalline wax Hi-Mic-2095 (manufacturted by Nippon Seiro Co., Ltd.)
[*4]Pentalit M (Koei Chemical Co., Ltd.)
[*5] and [*6]The results with Comparison sample-1 in Table 1 were taken as the references.

[Example-C]

Viscol 550P (Trade name manufactured by Sanyo Chemical Industries, Ltd.; white powder, melting point 150° C., mean molecular weight 4,000) as low molecular weight propylene polymer, Microcrystalline wax Hi-MiX-2095 (manufactured by Nippon Seiro Co., Ltd.; M.P. 96° C.) as petroleum wax and pentaerythritol (the same product as in Example-A) were mixed at the heat storage ratios indicated under Experiment Nos. 15–20 in Table 3 for the total of 100% by weight parts, respectively. Thereafter, individual samples were put in separate glass beakers, and the long heating stability test samples were prepared by subjecting them to the similar treatments as in Example-A, while heating them at 120° C. Then the characteristics measurements were taken

[Example D]

Tetrafluoroethylene resin powder M-12 (Trade name manufactured by Daikin Industries, Ltd.; mean molecular weight more than 1 million, particle diameter approx. 0.1–10μ), as fluorine-resin polymer, HNP-9 (the same product as in Example-B) as petroleum wax and mixture of Pentalit M (the same product as in Example-A) and Pentalit (Trade name manufactured by Koei Chemical Co., Ltd., containing 1.6% by weight in total of dipentaerythritol and bispentaerythritol monoformal condensate) in a ratio of 1:1 were mixed in the heat storage substance composition ratios indicated under Experiment Nos. 21 and 22 in Table 4 for the total of 100% by weight parts, respectively. Thereafter, the mixture was treated in the similar way as in Example-B, thereby preparing long heating stability test samples. In the following, measurement results of characteristics taken similarly as in Example-B are shown in Tables 4-(1) and 4-(2).

TABLE 4

| | Heat storage material composition (weight %) | | | | Initial characteristics | | | |
|---|---|---|---|---|---|---|---|---|
| No. | Olefinic polymer | Fluorine resin polymer(*2) | Petroleum wax(*3) | pentaerythritol(*4) | Heat of phase transition (J/g) | Ratio of phase transition heat to that of pure pentaerythritol (%)(*5) | Ratio of the amount for storaging equal heat to the amount of pure pentaerythritol (weight ratio) | Phase transition temperature (°C.) |
| 21 | — | 5 | 25 | 70 | 229 | 84.8 | 1.18 | 178 |
| 22 | — | 25 | 25 | 50 | 166 | 61.5 | 1.63 | 178 |

| | Characteristcis after 230° C. × 500 hr | | | | |
|---|---|---|---|---|---|
| No. | Heat of phase transition (J/g) | Ratio of phase transition heat to that of pure pentaerythritol (%) | Phase transition temperature (°C.) | Fall in phase transition temperature (°C.) | Degree of discoloration of heat storage material | Judgment |
| 21 | 190 | 98.3 | 177.5 | 0.5 | Weak yellow | ◎ |
| 22 | 164 | 98.6 | 177.7 | 0.3 | Weak yellow | ◎ |

Criterion: ◎ Excellent ○ Good △ Fair X Poor
(*2)Tetrafluoroethylene: M-12 (manufactured by Daikin Industries, Ltd.)
(*3)HNP-9 (The same product as in Example-b)
(*4)Pentalit M: Pentalit = 1:1 Mixture
(*4) and (*5)The measurement results with Comparison sample-1 in Table 1 are taken as references.

With regard to the measurement results of Table 4, the characteristics measured after the 230° C. 500 hr long heating stability test, all show high stability, relative to the initial characteristics, as witness the results given under Experiment Nos. 21 and 22.

Figure 4:
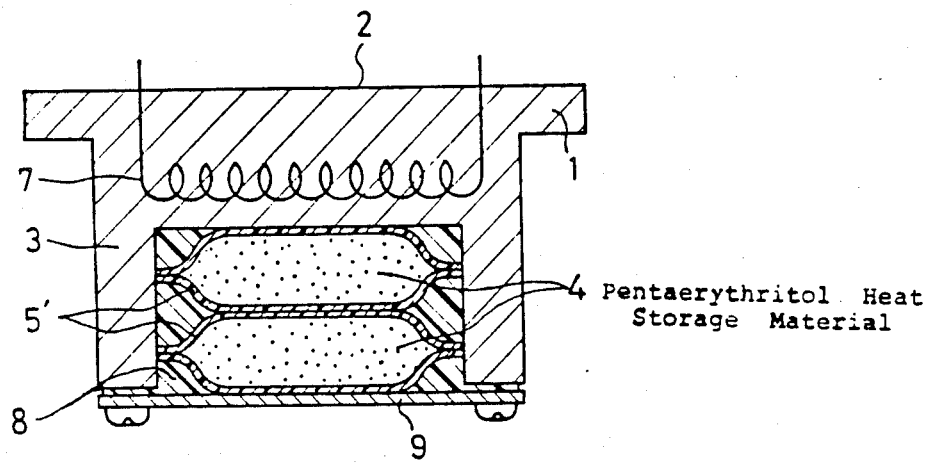
FIG. 4 is a sectional view of a heating apparatus having a heat storage device, a second embodiment of the present invention.

FIG. 4 shows a second embodiment of this invention. Referring to this figure, 5' denotes containers each formed in a bag made of 50–200μ thick fluororesin film by way of thermal welding, in which the heat storage substance 4 is hermetically enclosed. In this example, the material 4 is provided in two superposed layers. Numeral 3 designates a housing; and 7a heating element, the housing 3 and the heating element 7 being the same as in FIG. 1. Numeral 8 designates silicone such as silicone oil, silicone grease, silicone rubber, etc., interposed between the containers 5' and the housing 3, which not only helps to securely hold the container 5' inside the housing 3, but serves to upgrade the thermal transfer of both of them. Numeral 9 designates a housing cover mounted on the opening or mouth of the housing 3, which helps secure the container 5' by pressuring.

With the heat storage substance 4 sealed in a bag shape container 5' formed of fluororesin film by thermal welding, the heat storage substance is not brought in direct contact with ambient air and the metal of the housing 3, so that such states may be foreclosed from causing reduction in its heat storage capacity, and even when the heat storage substance 4 degrades during long-period use, the internal pressure of the container 5' will not continue rising, thanks to the gas permeability of the fluororesin. Moreover, not only is the productivity upgraded by composing the container 5' of the fluororesin film, but also cost advantage may be achieved by making use of PTFE which is inexpensive among fluororesins though its moldability is not high. Besides, by having silicone 8 interposed between the containers 5' and the housing 3, the heat transfer between them is improved, with a result that the heat storage substance 4 for heating characteristic of the heating element 7 is elevated and that the heat storage time is thereby curtailed. It should be noted that if setting liquid silicone rubber is employed as the silicone 8, securing of containers may be made perfectly, thus permitting use of a very simple housing cover 9.

Figure 5:
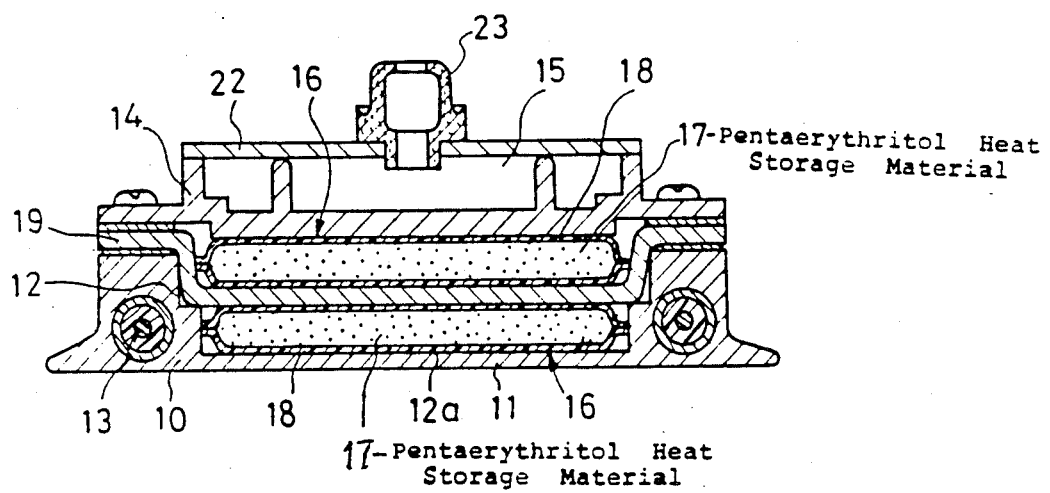
FIG. 5 is a sectional view of the essential part of a third embodiment in which the heating apparatus having a heat storage device of the present invention is applied to an electric iron.
Figure 6:
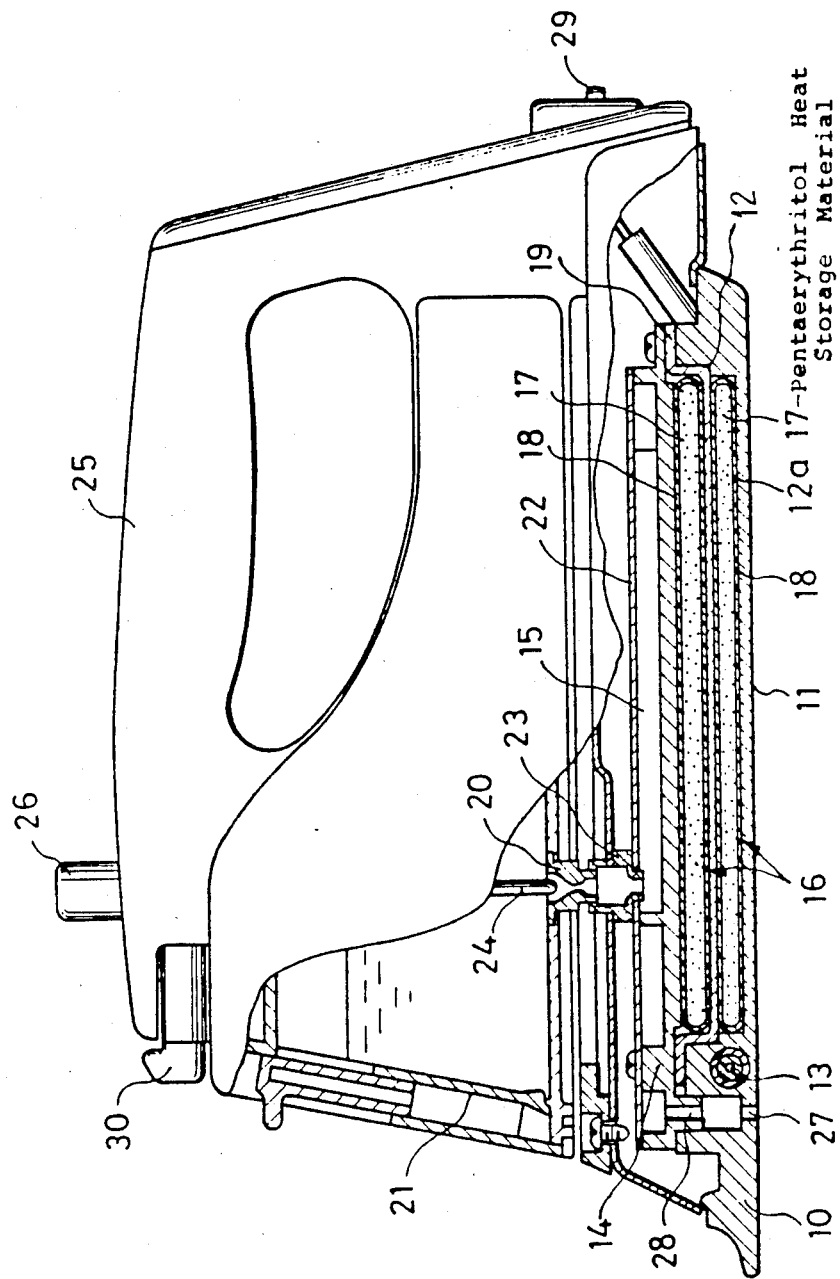
FIG. 6 is a partly broken sectional view of the electric iron.
Figure 7:
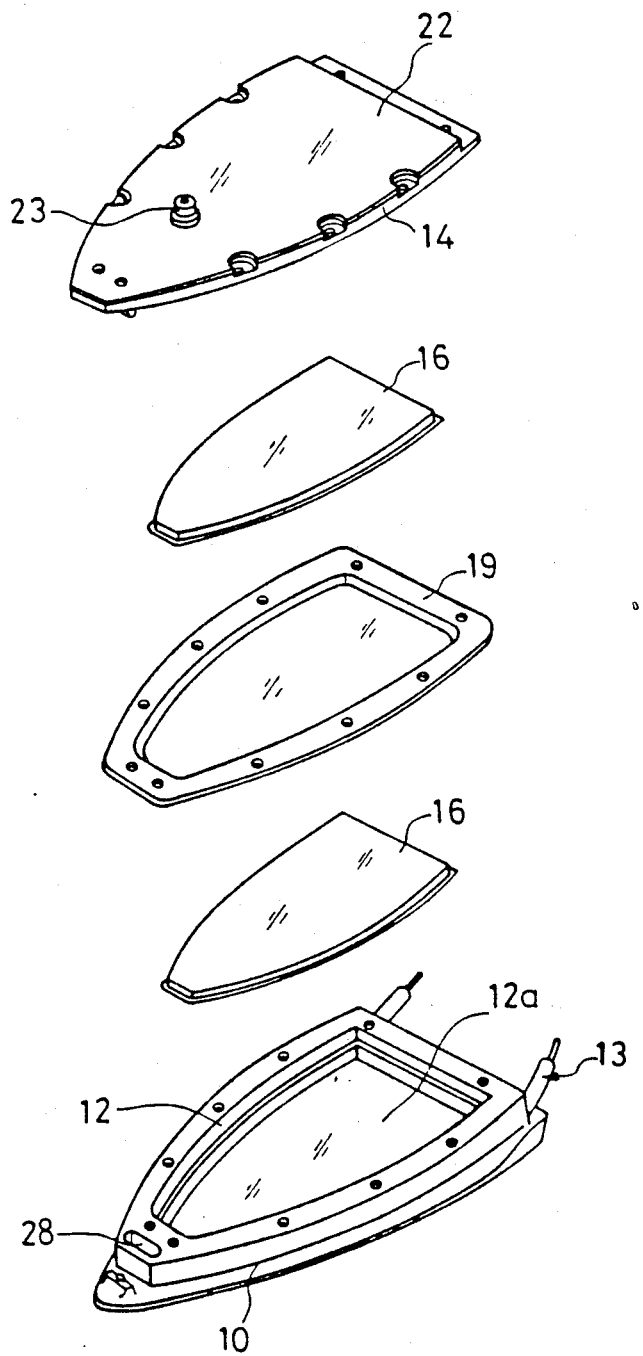
FIG. 7 is a disassembled perspective view of the electric iron.

FIGS. 5–7 represent a third embodiment in which the heating apparatus having a heat storage device of the present invention is applied to an iron. Referring to these figures, 10 denotes an iron base provided with a heating surface 11 and a housing 12 at its upper surface, in which a heating element 13 comprising a sheathed heater is embedded. Numeral 14 designates a housing cover in which a vaporizing chamber 15 is provided integrally therewith on the upper surface thereof. Numeral 16 stands for a flat plate-shaped heat storage element composed of a heat storage substance 17 of pentaerythritol as its main component which is coated with a fluororesin film 18. A pair of heat storage elements 16 are stacked and are held between and in contact with the internal bottom surface 12a of the housing 12 and the inside surface of the housing cover 14 which are matched therewith. Numeral 19 is a heat transferring plate made of a metal of high thermal conductivity, such as aluminum, or the like, which is not only in contact with the two heat storage elements 16, but also whose whole circumferential rim is held between the base 10 and the housing cover 14 and is thermally connected therewith. Numeral 20 shows a dripping nozzle, which is joined with the vaporizing chamber 15 through a packing 23 mounted on a vaporizing chamber cover 22. Numeral 24 designates an opening-closing rod which is interlocked with a steam control button 26 located on top of the handle 25 and which is vertically movable to control the supply of water through the dripping nozzle 20. Numeral 27 denotes a steam ejecting hole provided in the heating surface 11 of the base 10, which is communicated with the vaporizing chamber 15 through a steam passage 28, and through which the steam generated in the vaporizing chamber 15 is ejected. Numeral 29 designates a power supply terminal which is connected with the heater 13 through a thermoregulator (not shown) and which is adapted to be connected with a power source to supply power therethrough. Numeral 30 designates a temperature control lever joined with the thermoregulator, which is used for adjusting the temperature setting of the base 10.

The operation of the iron composed as above described is explained hereunder:

As the electric iron is energized by connecting the power source to the power supply terminal 29, the heating element 13 evolves heat, whereby the housing 12 in the base 10, the housing cover 14 and the heat transferring plate 19 pinched therebetween are heated. At this time, the heat storage elements 16 are held between and in contact with the internal bottom surface 12a of the housing 12 and the inner surface of the housing cover 14 and are also in contact with the heat transferring plate 19. Therefore, each heat storage element 16 is heated from above and below over wide areas, so that heat is accumulated in the internal heat storage material 17 at high efficiency and in a short period. This material 17 which has stored heat starts heat discharging, after disconnection of the power source from the power supply terminal 29. The heat is then transmitted to the base 10 and the housing cover 14 at high efficiency for the same reason as above-mentioned, thus, effecting curbing of the temperature drop of the heating surface 11 for a long time. Accordingly, ironing may be performed in this state without the power supply cord being connected. Thus, snagging of clothing and restriction of the operational range by a power supply cord are forestalled, whereby the operational facility is of the iron improved. When the opening-closing rod 24 is opened by operating the steam button 26, water is supplied into the vaporizing chamber 15 from the dripping nozzle 20 through the packing 23 and the steam generated there is jetted out through the steam injecting port 27 after passing through a steam passage 28. At this time, a large amount of heat will be lost from the vaporizing chamber 15, but since the vaporizing chamber 15 is integrally formed on the housing cover 14 over a wide area, a stable supply of steam will be made available without permitting a quick temperature drop. Since the vaporizing chamber 15 is provided on the housing cover 14, the temperature of the bottom surface of the base 10 will not be affected by the temperature of the vaporizing chamber 15, foreclosing local temperature drop on the bottom surface of the base 10 when generating steam.

Figure 8A:
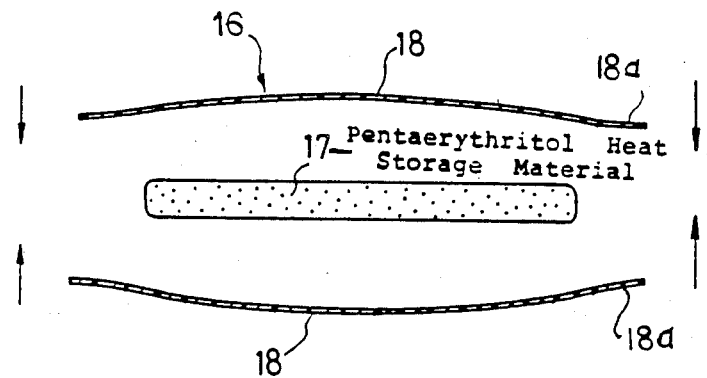
FIGS. 8A and 8B show respective steps in a method of making a heat storage element according to this invention.
Figure 8B:
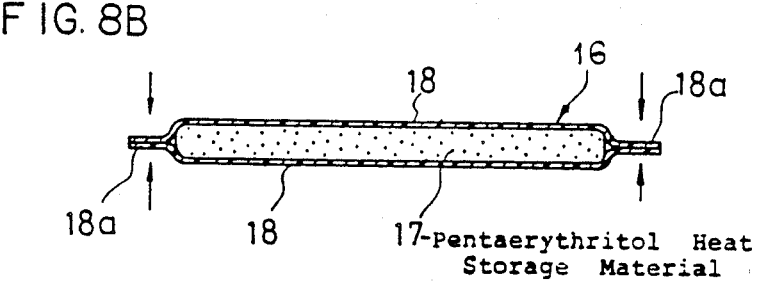

In the following, the heat storage element 16 is described:

Available as the manufacturing method of the heat storage element 16 is a method wherein, for example, as shown in FIGS. 8A and B, a heat storage substance 17 is preliminarily press-formed into a plate shape and is interposed between 2 sheets of fluororesin film 18, to be covered therewith by the whole peripheral rims 18a of the film 18 being bonding to each other by way of thermal welding, etc. It is also proper to form the flat-shape element after the heat storage substance 17 has been filled and hermetically sealed in the bag shaped fluororesin film 18. Anyway, it is only necessary that the element is in a flat plate shape and that the material 17 is covered by the film 18. The thickness of this element 16 should desirably be less than 7 mm in view of the time required for heat conduction and accumulation of the material 17.

According to an experimental example, when two sheets of 7 mm thick heat storage substance 17, totalling 100 g in weight, and covered with 50-200μ films are incorporated in a base having a 1 kW heater 13, approximately 20 minutes cordless operation can be performed, using this electric iron. Generally speaking, for ordinary ironing work, a working time of 20 min is sufficient.

Figure 9:
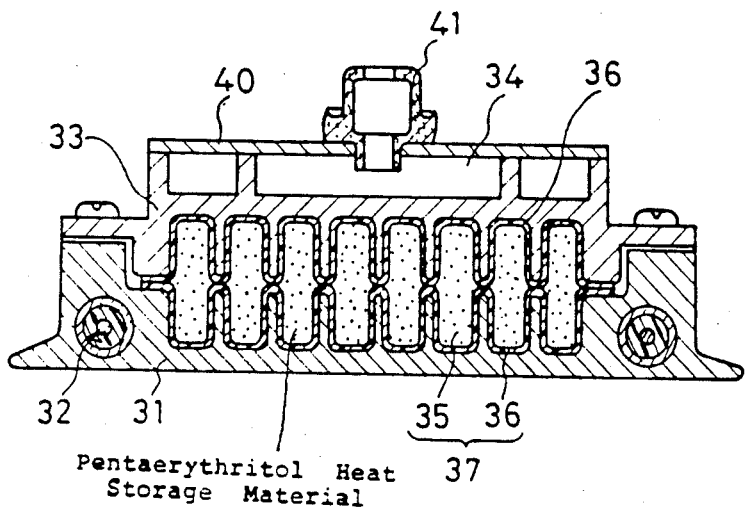
FIG. 9 is a sectional view of the essential part of a fourth embodiment wherein the heating apparatus having a heat storage device of the present invention is applied to an electric iron.
Figure 10:
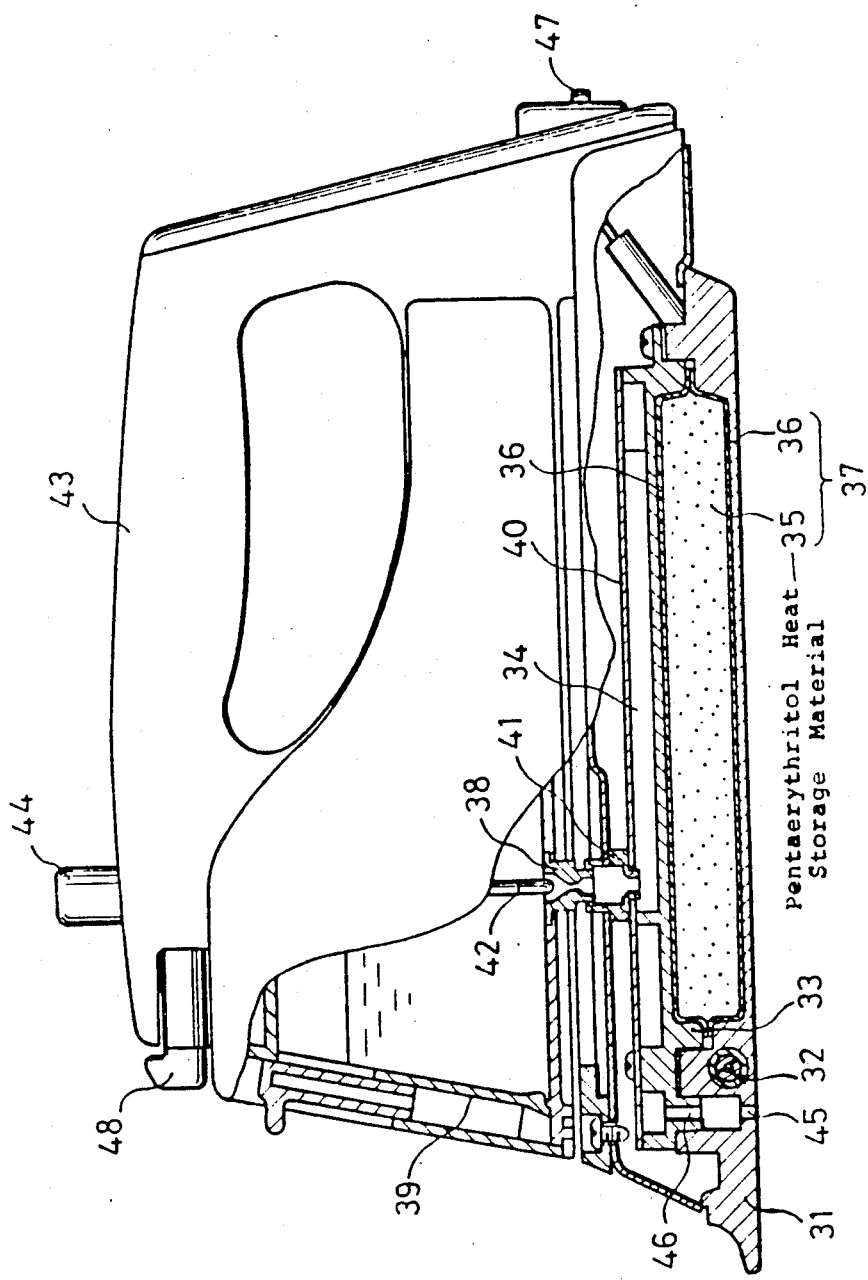
FIG. 10 is a partly broken sectional view of the electric iron.
Figure 11:
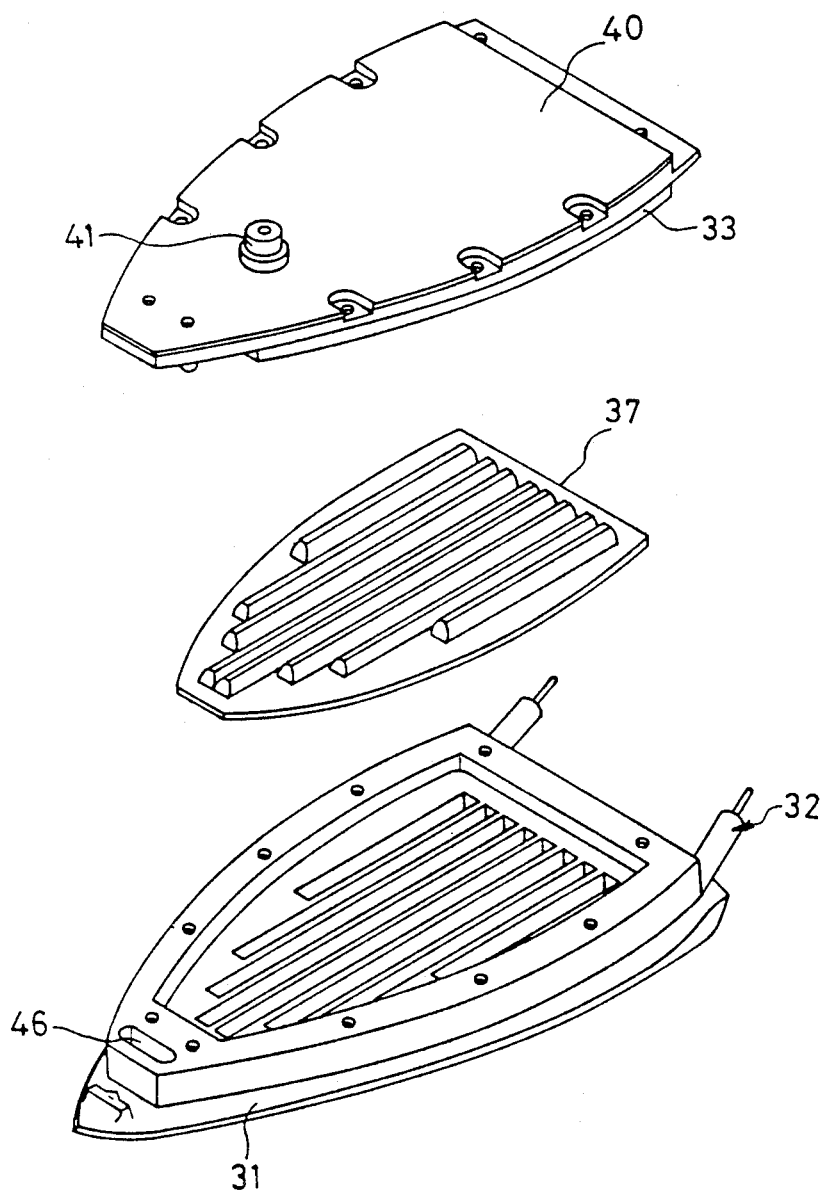
FIG. 11 is a disassembled perspective view of the essential part.

Next, FIGS. 9-11 represent a fourth embodiment in which, similarly as in the previous embodiment, a heating apparatus having a heat storage device of the present invention is applied to an electric iron.

Referring to the drawings, numeral 31 denotes a base wherein a heating element 32 is embedded. A housing cover 33 is provided integrally with a vaporizing chamber 34, each formed of die cast aluminum. Numeral 35 designates heat storage substance of pentaerythritol as its main component which is filled between two sheets of the fluororesin films 36, 36 which is formed in undulated shape and hermetically sealed, thereby composing a heat storage element 37. On the top surface of the base 31 and on the bottom surface of the housing cover 33, there are provided undulations which are mated with the undulations of the heat storage element 37, so that the base 31 and the housing cover 33 securely hold the element 37 therebetween and in contact therewith and also the contact areas between the element 37 and the base 31 and the cover 33 are increased. A dripping nozzle 38 is for supplying water stored in a tank 39 into the vaporizing chamber 34 and is joined to the vaporizing chamber 34 through a packing 41 mounted on the vaporizing chamber cover 40. An opening-closing rod 42, interlocked with a steam button 44 located on the top of the handle 43, is vertically movable to supply and stop the flow of water though the dripping nozzle 38. A steam ejecting port 45 is located at the bottom of the base 31, and is communicated with the vaporizing chamber 34 through a steam passage 46. A power supply terminal 47 is linked to the heating body 32 through a thermoregulator (not shown) and through which the power source is connected. A temperature control lever 48 is joined with the thermoregulator for setting the temperature of the base 31.

The operation of the electric iron composed as hereabove described is explained hereunder:

When the iron is energized by connecting a power source to the power supply terminal 47, the heating element 32 evolves heat, whereby the base 31 and the housing cover 33 are heated. At this time, the heat storage element 37, which is pinched between and in contact with the base 31 and housing cover 33, mated undulatorily therewith, is heated through large areas of both top and bottom surfaces, so that the heat is accumulated in the internal heat storage substance 35 at high efficiency and in a short time. The heat storage substance in which heat has been accumulated will start discharging heat, when the power source is disconnected from the power supply terminal 47, and this heat will be transmitted at high efficiency to the base 31 and the housing cover 33 for the same reason as above-mentioned, thereby curbing temperature drop and retaining the ironing temperature for a long time. Accordingly, it becomes possible to conduct ironing in this state, and snagging of a power supply cord on clothing or restriction of the operating range due to the use of a power supply cord is forestalled. As a result, the operational facility of the iron is enhanced. Ejection of steam is made by opening the opening-closing rod 42 by operating the steam button 44. Then, water is supplied from the dripping nozzle 38 to the vaporizing chamber through the packing 41, and the steam produced there is ejected through the steam ejection port 45 after passing through the steam passage 46. At this time, a large amount of heat will be lost from the vaporizing chamber, but since the vaporizing chamber is formed on the housing cover 33 over a wide area and integrally therewith, abrupt temperature drop will not take place, thereby assuring a stable steam supply for long. Besides, with the vaporizing chamber 34 mounted on the housing cover 33, the temperature of the bottom surface of the base 31 is not affected by the temperature of the vaporizing chamber 34 and a local temperature at the bottom surface of the base 31 at the time of steam generation is foreclosed.

While in the first through fourth embodiments as hereabove described, the apparatuses in each have a heat storage element, wherein a heat storage substance of pentaerythritol as its main component is sealed in a container made of a fluororesin, is contained in a housing, hereafter an explanation is made of comparable apparatuses wherein a fluororesin coating is formed on the internal surface and the peripheral rim of the housing mouth.

Figure 12:
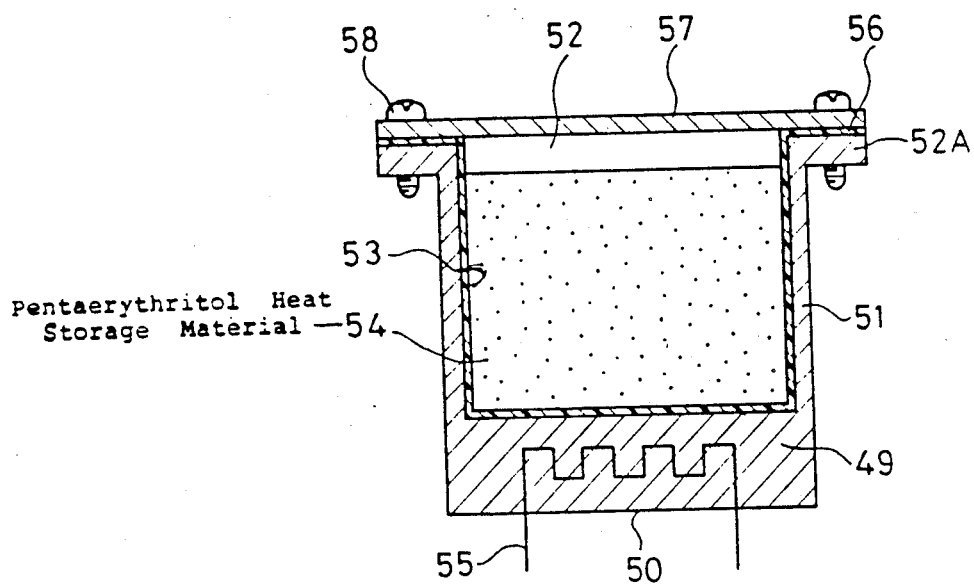
FIGS. 12 and 13 are sectional views of heating apparatuses having a heat storage device of fifth and sixth embodiments of the present invention.

FIG. 12 shows a fifth embodiment of this invention wherein a base 49 has a heating surface 50 at its bottom and a housing 51 at its top. On the internal surface of the housing 51, a fluororesin coating 53 of about 15μ-5 mm thickness is formed. A heat storage substance 54 of pentaerythritol as its main component is filled into the housing 51 through the top opening 52. A heating element 55 is for heating the heat storage substance 54. On the opening peripheral rim 52A, a fluororesin coating 56 is formed, against which the housing cover 57 is pressed in contact therewith by means of screws 58, thereby sealing the opening 52.

As described hereabove, by forming a fluororesin coating 53 which is inert to pentaerythritol on the internal surface of the housing 51, the effect of metal on the heat storage substance 54 may be foreclosed. And at the same time, the fluororesin film 56 is formed on the opening peripheral rim 52A, which film exhibits the elasticity of a resin even at high temperatures, and the fluororesin film 56 make a hermetic closure between it and the housing cover 57, and prevents ambient air from entering into the housing 51 and thereby affecting the durability of the heat storage substance 54.

Figure 13:
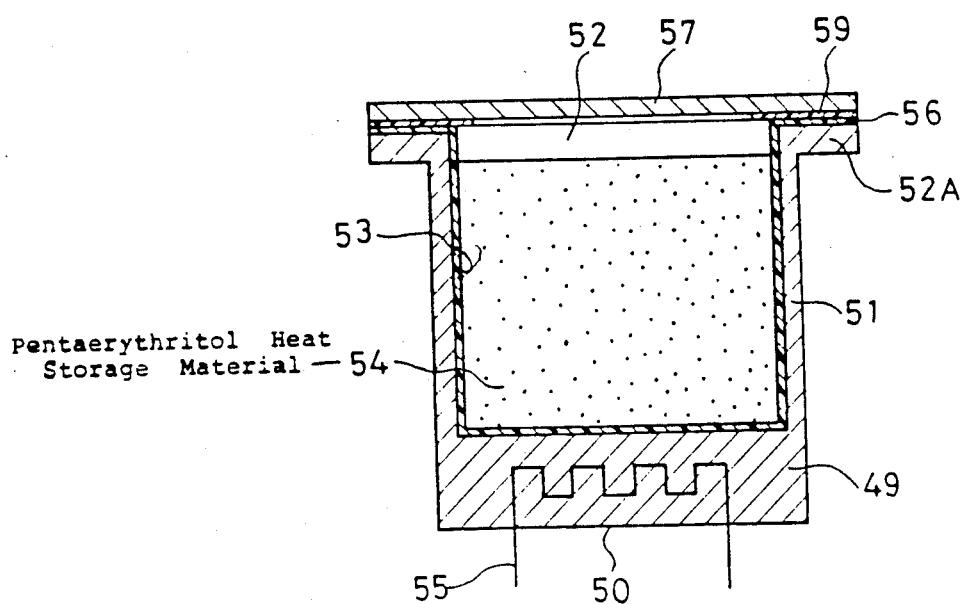

FIG. 13 shows a sixth embodiment of the present invention. In this apparatus, not only is a fluororesin coating 56 formed on the opening peripheral rim 52A of the housing 51, but also another fluororesin coating 59 is formed on the underside marginal edge portion of the housing cover 57; and by welding these fluororesin coatings 56 and 59 to each other the opening 52 is sealed. As a result of this construction, the opening peripheral rim 52A and the cover member 57 may be securely fastened together without using any screws, etc. It should be noted that although the fluororesin film 59 should preferably be provided all over the underside of the cover member 57, it is sufficient to provide it only to the part facing the opening peripheral rim 52A, as shown in the figure.

In the aforementiond first through sixth embodiment, as specific examples of the heating apparatuses having a heat storage device of the present invention, only electric irons are described as an appliance utilizing the storage device. But the heat storage device can be applied to many appliances. For instance, if it is applied to an electric pan, the pan can be disconnected from power source, after being energized, and carried to the table for cooking, so that hot and delicious cooked foods can be eaten without allowing them to cool while partaking of the meal. Another effect obtained by adding the heat storage device is that, even if low-temperature food is put in a pan, during energization and cooking, the temperature does not drop down, hence the cooking time is not prolonged. Furthermore, if, for example, apparatus of this invention is applied to hot plates, an improvement in the temperature distribution on the heating surface is possible, and besides, by applying it in heating apparatuses for warming trays, tempura pans, electric pots, etc., upgrading of heating characteristics and enhancement of facility due to cordless operation may be achieved.

As hereabove described, the present invention provides a highly durable and safe heating apparatus having an excellent heat storage device wherein a heat storage substance of pentaerythritol as its main component is contained in a housing provided in a base formed of a metal, in a state such that the heat storage substance not only is isolated from the housing, but also the circulation of ambient air is shut off, whereby decrease in the heat storage capacity of pentaerythritol is prevented and abnormal rising of internal pressure of the heat storage container is foreclosed even in long time usage.

What is claimed is:

1. A heating apparatus having a heat storage device comprising:
   a metal body including means defining a hollow housing,
   a heat storage device confined in said housing in heat exchange therewith, said device containing a heat decomposable heat storage substance comprising 30-99% by weight pentaerythritol, said body also including means for heating said heat storage device to a selected temperature for storing heat therein, and
   enclosure means made mainly of fluororesin for completely enclosing said heat storage substance to isolate said heat storage substance from said metal body and to prevent contact of ambient air with said heat storage substance, said enclosure means being permeable to gases formed by decomposition of said heat storage substance during use of said apparatus.

2. A heating apparatus in accordance with claim 1, wherein
   said heat storage substance is:
   a mixture of 1-70% by weight of a composition comprising one member selected from the group consisting of (1) a polymer of less than 70% by weight of at least one member selected from the group consisting of olefinic polymer and fluorine-resin polymer and (2) petroleum wax of less than 70% by weight of carbon having a carbon number of at least 16; and
   30-99% by weight of pentaerythritol.

3. A heating apparatus having a heat storage device in accordance with claim 2, wherein
   said olefinic polymer is at least one member selected from a group consisting of ethylene polymer, propylene polymer and methylpentene polymer, and said fluorine-resin polymer is at least one member selected from a group consisting of tetrafluoroethylene polymer, tetrafluoroethylene-perfluoroalkylvinyl ether copolymer, tetrafluoroethylene-hexafluoropropylene copolymer, tetrafluoroethylene-ethylene copolymer and vinylidene fluoride polymer.

4. A heating apparatus having a heat storage device in accordance with claim 2, wherein
   the petroleum wax is at least one member selected from the group consisting of paraffin waxes, microcrystalline wax and petrolatum which have a carbon number of at least 16.

5. A heating apparatus having a heat storage device in accordance with claim 1, wherein
said enclosure means is at least one fluororesin container disposed in the housing and sealing said heat storage substance therein.

6. A heating apparatus having a heat storage device in accordance with claim 5, wherein
a silicone material is interposed between said at least one container and said housing.

7. A heating apparatus having a heat storage device in accordance with claim 5, wherein
the hollow housing includes an internal bottom surface and a top opening closed by a removable housing cover, and
a plurality of flat plate-shaped heat storage elements each having a heat storage substance enclosed in a container made of a fluororesin film are securely held between and in contact with said internal bottom surface and the inner face of said cover.

8. A heating apparatus having a heat storage device in accordance with claim 7, wherein
the elements are stacked and at least one heat transferring plate thermally linked to the housing or the housing cover is interposed between adjacent of said heat storage elements.

9. A heating apparatus having a heat storage device in accordance with claim 7, wherein
said at least one container is formed in an undulated shape and is securely pinched between and in contact with the housing and the housing cover which mate with the undulations of said at least one container.

10. A heating apparatus having a heat storage device in accordance with claim 1, wherein the hollow housing includes an opening closed by a removable housing cover having therein
a vaporizing chamber.

11. A heating apparatus having a heat storage device in accordance with claim 1, wherein
the housing has an opening having a peripheral rim and said enclosure means comprises a fluororesin coating formed on the inside surface of said hollow housing and the defining means includes a removable housing cover mounted on said rim to seal said opening.

12. A heating apparatus having a heat storage device in accordance with claim 11, wherein
a fluororesin coating is formed on at least the part of the housing cover which abuts on the opening peripheral rim of the housing.

* * * * *